United States Patent [19]

Nobuoka et al.

[11] 3,969,494
[45] July 13, 1976

[54] METHOD FOR IMPROVEMENT OF PROPERTIES OF SYNTHETIC YELLOW IRON OXIDE

[75] Inventors: Soichiro Nobuoka, Nara; Takashi Asai, Minoo; Kazuaki Ado, Sakai, all of Japan

[73] Assignee: Agency of Industrial Science & Technology, Tokyo, Japan

[22] Filed: Feb. 21, 1975

[21] Appl. No.: 551,652

[30] Foreign Application Priority Data
Feb. 22, 1974    Japan.................. 49-21846

[52] U.S. Cl................... 423/633; 423/634
[51] Int. Cl.².................. C01G 49/02
[58] Field of Search .......... 423/633, 634, 138, 140, 423/141

[56] References Cited
UNITED STATES PATENTS

| | | | |
|---|---|---|---|
| 3,843,773 | 10/1974 | Pingaud | 423/634 |
| 3,845,198 | 10/1974 | Marcot | 423/633 |
| 3,867,516 | 2/1975 | Bodson | 423/633 |

FOREIGN PATENTS OR APPLICATIONS

| | | | |
|---|---|---|---|
| 43-12435 | 5/1967 | Japan | 423/633 |
| 212,240 | 7/1968 | U.S.S.R. | 423/634 |

*Primary Examiner*—O. R. Vertiz
*Assistant Examiner*—Wayne A. Langel
*Attorney, Agent, or Firm*—Oblon, Fisher, Spivak, McClelland & Maier

[57] ABSTRACT

Synthetic yellow iron oxide ($\alpha$-FeOOH) is dispersed in an aqueous 0 - 10N alkali solution and the resultant dispersion is subjected to a hydrothermal treatment at 100°– 250°C. This treatment improves the synthetic yellow iron oxide in that it converts imperfect crystals present in said iron oxide into perfect crystals, changes particles thereof from the shape of needles to that of rods, makes the particle size substantially uniform and heightens the resistivity thereof to heat by about 50°C. The modified synthetic yellow iron oxide thus obtained is innoxious and can be used as a pigment in paints.

5 Claims, 2 Drawing Figures

METHOD FOR IMPROVEMENT OF PROPERTIES OF SYNTHETIC YELLOW IRON OXIDE

BACKGROUND OF THE INVENTION

This invention relates to a method for improving the properties of synthetic yellow iron oxide. More particularly the present invention relates to a method for easily improving synthetic yellow iron oxide, a compound which has been being consumed in large quantities, in terms of crystallinity, particle size distribution and particle shape and for imparting thereto heightened thermal resistivity and clear color tone.

The yellow pigments which are available today include lead chromate, strontium chromate, cadmium sulfide, benzidine yellow, etc. However, since these pigments are invariably noxious or carcinogenic substances, use of these pigments will be increasingly more restricted in the future with a view to preserving human health and preventing the environment from pollution. In view of the liklihood of such restriction, industries which produce or use coloring materials anxiously await the development of an excellent innoxious yellow pigment capable of taking the place of such noxious yellow pigments as mentioned above.

Unlike the yellow pigments mentioned above, yellow iron oxide is perfectly innoxious and also inexpensive and, therefore, has long been used in large quantities as the raw material for colorants and magnetic recording powders. Particularly because of its perfect freedom from noxiousness, it is used in imparting a color to the outer covering cigaret filters, to the feed used in poultry farming and to cosmetic materials. However, such yellow iron oxide still suffers from the disadvantage that the color tone produced thereby is not clear and the pigment itself has inferior thermal resistivity. For this reason, it has failed to find favorable acceptance as a substitute for said noxious yellow pigments.

At present, yellow iron oxide is wholly produced by resorting to a method whereby microcrystalline nuclei of ferrous sulfate (II) are caused to grow by the hydrolysis of the aqueous solution of ferrous sulfate (such as the method of Nobuoka et al as reported in Bulletin of the Government Industrial Research Institute, Osaka, 6, 135 (1955), or the method of Nobuoka et al as reported in Industrial Chemistry, 66, 412 (1963) etc.). The product by these methods is composed chiefly of $\alpha$-FeOOH and has a structure of Goethite, with the component particles formed in the shape of needles resembling tactoids. These methods cause crystals to attain growth in the aqueous solution of a salt of sparing solubility nearing perfect insolubility. In view of this principle of production, it is substantially inconceivable that a product having a uniform particle size and possessing homogenous quality throughout can be obtained by merely adjusting the production conditions. Accordingly, some of the grades of synthetic yellow iron oxide available today on the market contain imperfectly crystallized particles and other grades contain large and small particles intermingled with each other.

It is already well known that the various properties exhibited by a powdery system generally are correlated with the morphology of the constituent particles of the powdery system. In the case of pigments, the morphology of particles has an effect upon such factors as color tone, hiding power, oil-absorbing property, tinting strength, rheological properties in paints, and film strength. In the case of yellow iron oxide, if large particles and small particles coexist therein in a mixed state, then the properties exhibited by the large particles and those exhibited by the small particles differ and, in this compound which exists in the form of a powder as a whole, they will offset each other and give rise to statistically averaged properties. In terms of color tone, for instance, the color produced by large particles and that produced by small particles differ from each other (Nobuoka et al: J. Chem. Soc. Japan, Ind. Chem. Sec., 66, 412 (1963)). When these particles are mixed, their respective colors intermingle to produce a diminished color in much the same way as when painting colors are mixed, with the result that both luminosity and chromaticity are decreased to produce a darkish color tone as a whole. Thus it is desirable to obtained a pigment in such form that the constituent particles thereof have as uniform a particle size as possible. The same principle also applies substantially to the effect of the presence of imperfect crystals upon the properties of a powdery matter.

Yellow iron oxide is used in large quantities as the raw material for magnetic recording media. For this purpose, $\alpha$-FeOOH is subjected to a heat treatment for reduction and oxidation to produce the needle-shaped $\gamma$-Fe$_2$O$_3$. The morphological magnetic anisotropy and the acicular orientation of the product are utilized. In this case, since the heat treatment governs the morphology of magnetic particles of $\gamma$-Fe$_2$O$_3$ to be formed, the particle size distribution of the raw material and that of the magnetic powder as the product are closely related to each other. In the magnetic properties of a magnetic powder, particle size and the ratio between particle dimensions manifest themselves directly in the form of morphological magnetic anisotropy. To be more specific, the magnetic properties possessed by magnetic particles of different diameters are different from one another. The particle size distribution in a magnetic powder is accurately measured in terms of anisotropic magnetic field distribution and, thus, is utilized as the date for evaluation of acceptability for recording. If particles finer than the allowable lower limit are present, for example, they impair the transferring property and degrade the magnetic field orientation. Particles larger than the allowable upper limit are not desirable, for they give rise to a structure of multiple magnetic domains and bring about a decline of coercive force. The magnetic recording powder, therefore, proves suitable when it is in a form such that the range of particle size distribution is narrow and the acicular particles are as uniform as possible. In the light of the aforementioned principle of production, it is essential for the formation of such magnetic powder that the raw material $\alpha$-FeOOH to be used should possess a uniform particle size distribution.

An object of the present invention is to provide a method for improving the properties of synthetic yellow iron oxide for thereby allowing imperfect crystals present in said compound to be converted into perfect crystals, the particle size distribution thereof to be substantially uniformized and the thermal resistivity thereof to be enhanced.

SUMMARY OF THE INVENTION

To accomplish the aforementioned object, the present invention provides a method which comprises dispersing synthetic yellow iron oxide in an aqueous 0 − 10N alkali solution and subjecting the resultant dispersion to a hydrothermal treatment at 100° − 250°C.

This treatment causes imperfect crystals present in said synthetic yellow iron oxide to be converted into perfect crystals, the particles of the compound to be changed from the shape of needles to that of rods, the particle size distribution to be made substantially uniform and the thermal resistivity thereof to be heightened by about 50°C. The modified yellow iron oxide thus obtained is used as a pigment for paints in the place of conventional yellow pigments. This modified compound, because of the substantial uniformity of its particle size, is also usable as the raw material for magnetic recording media.

Other objects and other characteristic features of the present invention will become apparent from the description to be given in further detail herein below with reference to the accompanying drawings.

DETAILED DESCRIPTION OF THE INVENTION

Figure 1:
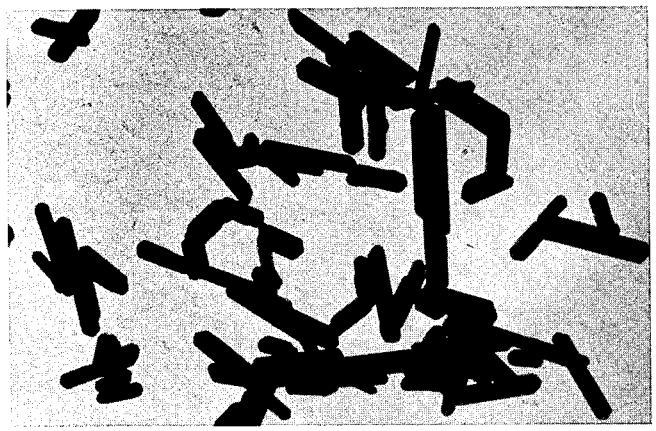
FIG. 1 is a photomicrograph of yellow iron oxide treated by the method of the present invention, taken with the aid of an electron microscope.

On the basis of this assumption that the aforementioned fault inherent to synthetic yellow iron oxide is ascribable to hysteresis developed in the course of production, the morphology of constituent particles and the crystalline structure of the compound, the inventors pursued a devoted research after a method capable of producing stable yellow iron oxide which possesses uniform particle size distribution and excludes imperfect crystals. They have consequently succeeded in developing a method which improves yellow iron oxide by converting imperfect crystals present in the compound into perfect crystals, making the particle size uniform and ameliorating the dimensional ratio of acicular crystals. Further, this method enables the thermal resistivity of the compound to be heightened by about 50°C, the susceptibility to grinding effect to be decreased, the color tone to be enhanced in clarity and other particle properties to be improved. It has been confirmed, therefore, that the yellow iron oxide improved by the present invention can take the place of other yellow pigments and is suitable as the raw material for innoxious traffic paints, magnetic recording media, etc.

Now, a description will be given with respect to the construction of the present invention. This invention relates to a method for the improvement of properties of yellow iron oxide produced by the wet growth process, which method is characterized by the steps of dispersing said yellow iron oxide in an aqueous 0 – 10N alkali solution and subjecting the resultant dispersion to a hydrothermal treatment at temperatures in the range of from 100° to 250°C, whereby imperfect crystals are converted into perfect crystals, the particle size is adjusted and the pigment properties are improved. In the present invention, water or an aqueous alkali solution having a normality of up to 10 is used as the medium for the hydrothermal treatment mentioned above. Examples of the alkali the 0 – 10N aqueous solution of which is used for said hydrothermal treatment include sodium hydroxide, potassium hydroxide, sodium carbonate, potassium hydroxide and aqua ammonia. The concentration of such alkali in said aqueous solution is desired not to exceed 10N. At a higher concentration, the alkali in the aqueous solution will decompose the raw material to produce α-iron oxide or form an alkali ferrite. The slurry resulting from the mixture of yellow iron oxide with the aqueous alkali solution is placed in an autoclave and subjected to hydrothermal treatment. For this purpose it is desirable to use an autoclave of the conventional type having the inner surface thereof covered with nickel or silver. The shell of this autoclave has only to withstand a pressure of the order of 20 atmospheres, because the hydrothermal treatment will fulfill its purpose sufficiently when it is performed under a pressure equalling the ordinary boiler pressure as described afterward.

Desirably the hydrothermal treatment is carried out at temperatures in the range of from 100° to 250°C, though the duration of reaction decreases with the increasing temperature within said range. When this treatment is performed at a temperature above the upper limit 250°C of the range, the yellow iron oxide will be converted to α-iron oxide or an alkali ferrite in the same way as in the aforementioned case.

The hydrothermal treatment time is closely related to the temperature of said treatment. A short time will suffice when the treatment is performed at a high temperature. If the temperature of the treatment is low, then a relatively long time is required.

Owing to the hydrothermal treatment described above, minute particles of the yellow iron oxide are dissolved and then allowed to attain growth into particles of a suitable diameter and, at the same time, imperfect crystals are converted into perfect crystals. At the end of the treatment, the precipitate and the mother liquor are separated by a suitable known method. The mother liquor separated from the precipitate does not contain any by-product therein and, therefore, can be put to cyclic use in its unmodified state. The precipitate is washed with water, filtered and dried to become a final product.

When water is used specifically as the medium, the step of washing with water can be dispensed with, although the effect of the hydrothermal treatment upon the improvement of properties is slightly less than that attainable by the treatment in an aqueous alkali solution. Therefore, the precipitate is separated from the mother liquor and immediately dried into a final product.

The present invention will now be explained with reference to a typical experiment. Sodium hydroxide was used as the alkali. Aqueous solutions containing this alkali at concentrations of 0, 0.1N, 0.5N, 1.0N and 2N were prepared. To 200ml of each of the aqueous solutions, 20g of synthetic yellow iron oxide was added and dispersed therein by agitation. The slurry thus obtained was placed in a silver beaker having an inner volume of 300ml, set in position in an autoclave containing a small volume of water and subjected to a hydrothermal treatment at 200°C for five hours. During this treatment, the interior of the autoclave was maintained under saturated pressure of steam which was indicated to be 15 kg/cm$^2$. The precipitate which occurred in consequence of this hydrothermal treatment was separated from the mother liquor, washed with water, filtered and dried and collected as a final product. With the respect to the products thus obtained, the specific surface area was determined by the BET method, the dimensional proportion of needle crystals calculated on the basis of the photomicrographs taken by an electron microscope and the half-value width of characteristic diffraction curve of α-FeOOH estimated from the X-ray diffraction diagram respectively. The values were then compared with those obtained of synthetic yellow iron oxide in its untreated state. The results were as shown in Table 1.

A sample of the product of the hydrothermal treatment carried out at 200°C for 5 hours in the medium of an aqueous 2N sodium hydroxide solution was heated up to 350°C. In the course of this treatment, the sample was analyzed with respect to development of thermal decomposition at indicated intervals over the temperature range of from 150°C to 350°C. The results were as shown in Table 2.

Table 1

|  |  |  |  |  |  | Untreated raw material (control) |
|---|---|---|---|---|---|---|
| Concentration of NaOH (N) | 0 | 0.1 | 0.5 | 1.0 | 2.0 |  |
| Specific surface area (m²/g) | 9.1 | 8.7 | 8.2 | 7.8 | 7.8 | 21.2 |
| Dimensional proportion of particles (length/width) | 4.2:1 | 4.0:1 | 3.6:1 | 3.3:1 | 3.3:1 | 7.8:1 |
| Half-value width of X-ray diffraction pattern (relative value) | 7 | 7 | 7 | 7 | 7 | 10 |

Table 2

| Sample |  | Decomposition temperature (°C) | 150 | 180 | 190 | 200 | 210 | 220 | 230 | 240 | 250 | 260 | 270 | 300 | 350 |
|---|---|---|---|---|---|---|---|---|---|---|---|---|---|---|---|
| Loss of weight (%) | Product by hydrothermal treatment |  | 0.20 | 0.31 | 0.33 | 0.35 | 0.55 | 0.91 | 1.21 | 1.40 | 2.04 | 9.12 | 9.28 | 9.74 | 10.20 |
|  | Untreated raw material (control) |  | 1.08 | 1.39 | 1.66 | 2.52 | 3.15 | 5.18 | 6.90 | 8.08 | 10.43 | — | — | 10.81 | 10.91 |

Figure 2:
FIG. 2 is a photomicrograph of a crude synthetic yellow iron oxide prior to treatment by the method of the present invention, taken with the aid of an electron microscope.

It is evident from Table 1 that in all the products obtained by the treatment of the present invention, the specific surface areas invariably are roughly one half to one third as large as that of the control (raw material) and that the values of specific surface area decrease with the increasing concentrations of sodium hydroxide in the aqueous solutions used as the media for treatment. In other words, the specific surface area decreases because the number of fine particles decreases or because the fine particles grow in size. This relationship can be clearly recognized from the photomicrograph of FIG. 1. FIG. 1 is a photomicrograph illustrating, in 20,000 magnifications, the crystals of yellow iron oxide obtained by the treatment involving use of an aqueous 2N alkali solution and FIG. 2 is a photomicrograph illustrating by way of comparative example, in 20,000 magnifications, the crystals of yellow iron oxide which has not undergone the treatment of the present invention. As is clear from these photomicrographs, the acicular crystals in the product obtained by the treatment are found to have gained in width and diminished in length as compared with those in the original untreated compound. Consequently, the dimensional proportion (length/width) has decreased to less than one half from about 7.8 to about 3.3, indicating that acicular tactoid particles have been transformed into particles of the shape of rods. It is noted from the X-ray diffraction diagrams that the half-value width of the characteristic diffraction pattern of α-FeOOH in the treated product is smaller than that of the untreated compound. This implies that imperfect crystals have been converted into perfect crystals or that fine particles have grown into large particles.

This table shows the cumulative loss of weight (expressed in percentage) due to thermal dehydration as measured at a varying temperature in the range of from 150°C to 350°C. Data similarly obtained for the sample of the untreated raw material are also given in the table for comparison. It should be noted in this connection that the stoichiometric loss of weight due to thermal decomposition at 350°C is 10.14%.

Table 2 shows that the cumulative loss of weight exceeds 2% at about 250°C in the case of the sample from the product of the hydrothermal treatment and at about 200°C in the case of the sample of the untreated compound. A finely powdered oxide of this type generally keeps about 1% of water adsorbed on the surface layer thereof. It is inferred from this fact that any loss of weight below the level of 2% is due to departure of such adsorbed water and that loss beyond this level is due to dehydration by the thermal decomposition of α-FeOOH. In fact a review of the results of test reveals that, in the sample of the product by the hydrothermal treatment, the formation of α-Fe₂O₃ through the reaction of the following reaction formula begins at a temperature above 250°C and, consequently, the sample changes its color from yellow to brown.

$$2FeOOH \rightarrow Fe_2O_3 + H_2O$$

In contrast, the sample of the untreated compound begins to change its color to brown around 200°C. The temperatures at which the two samples begin to change their colors are separated, as described above, by about 50°C. Appearance of the characteristic diffraction pattern of α-Fe₂O₃ in the X-ray diffraction pattern, disappearance of the characteristic absorption band of α-FeOOH from the infrared absorption spectrum and sharp increase of the specific surface area all serve to support this conclusion. Thus, the inventors have ascertained that, in consequence of a hydrothermal treatment performed on yellow iron oxide in the mother liquor of water or an aqueous alkali solution, imperfect crystals contained in the powder are converted to perfect crystals, the particles thereof change from the shape of needles to that of rods and, consequently, the thermal decomposition point thereof is heightened by about 50°C from about 200°C to about 250°C. In short, the method of the present invention serves the purpose of improving the thermal stability of yellow iron oxide by about 50°C.

The characteristic features of the present invention may be summarized as follows:

1. Conventional synthetic yellow iron oxide available in the market can be improved in thermal stability by about 50°C.
2. Conversion of imperfect crystals to perfect crystals and improvement of thermal stability cooperate to decrease the iron oxide's susceptibility to grinding and, as a result, render the treated product feasible as a pigment for traffic paints, for example.
3. The particle size distribution is notably improved as compared with the conventional product so that the treated product enjoys highly uniform particle size. Thus, the product affords a clear yellow pigment which suffers less from the phenomenon of color loss which is otherwise entailed in the mixture with other colors.
4. The product has a specific surface area about one fifth as large as that of the conventional product and possesses a markedly lower oil-absorbing capacity. When it is used in paints, therefore, it will help the paints acquire improvement in various properties.
5. When the α-FeOOH used as the raw material has good particle size distribution, the magnetic material which is consequently produced enjoys excellent particle size distribution. Thus, there can be produced an outstanding magnetic recording powder having narrow distribution in magnetic field anisotropy.
6. A magnetic powder has a small specific surface area when the particle size is distributed over a narrow range. When a magnetic paint is produced by using this powder, this powder serves to improve the directionality of the magnetic field and heighten the density to which magnetic powder is packed into the layer of paint being applied.
7. The treatment of this invention can be easily incorporated into and interconnected with the manufacture of yellow iron oxide as a step prior to the steps of filtration and drying.
8. The apparatus used for the hydrothermal treatment according to the present invention need only have strength enough to withstand pressure of the magnitude required for ordinary boilers. In the light of the presentday technical standard of the chemical industry, the method of the present invention is judged to be capable of continuous operation.
9. The aqueous alkali solution which is spent in the hydrothermal treatment of this invention contains no by-product and, therefore, can be put to cyclic use. Thus, the present invention can be practiced in a closed system designed to ensure prevention of environment pollution, Now, the present invention will be described specifically with reference to preferred embodiments. It should be understood that this invention is not limited in any way by these examples.

EXAMPLE 1

In an aqueous 1N sodium hydroxide solution, 50g of synthetic yellow iron oxide available in the market was dispersed. In an autoclave having the inner surface covered with nickel, the resultant slurry was placed and subjected to a hydrothermal treatment at 200°C for 30 minutes. Since the treatment is based on the reaction of dissolution and precipitation, the reaction proceeded stoichiometrically and the yield was 100%. The slurry thus treated was removed from the autoclave and filtered to separate the precipitate from the mother liquor. The precipitate was washed with water and dried. The product thus obtained weighed 49.5g, indicating that the yield was about 99%.

The properties of the product and those of the raw material, yellow iron oxide, are compared in Table 3.

Table 3

|  | Temperature of color change (°C) | Dimensional proportion of particle (length/width) | Specific surface area (m²/g) |
| --- | --- | --- | --- |
| Raw material (synthetic yellow iron oxide) | 200 | 8.0:1 | 18.5 |
| Yellow iron oxide treated by this invention | 250 | 3.8:1 | 7.0 |

It is clear from the preceding table that in consequence of the treatment according to this invention, the temperature at which change of color occurs was heightened by about 50°C and the particles gained in thickness. Because of improvement in the color purity and luminosity, the treated yellow iron oxide acquired a clearer yellow color than the raw material.

EXAMPLE 2

In an aqueous 0.5N sodium hydroxide solution, 60g, of synthetic yellow iron oxide having a specific surface area of about 8.1 m²/g available in the market was dispersed. The slurry was placed in an autoclave and subjected to a hydrothermal treatment at 150°C for 30 minutes. The precipitate thus formed was processed and recovered by following the procedure of Example 1. The product weighed 59.0%, indicating that the yield was 96%.

The properties of the product and those of the raw material, yellow iron oxide, are compared in Table 4.

Table 4

|  | Temperature of color change (°C) | Dimensional proportion of particle (length/width) | Specific surface area (m²/g) |
| --- | --- | --- | --- |
| Raw material (synthetic yellow iron oxide) | 200 | 7.5:1 | 8.1 |
| Yellow iron oxide treated by this invention | 250 | 3.8:1 | 3.5 |

The synthetic yellow iron oxide used as the starting material consisted of large particles and had a strong brownish color. Although it had a small specific surface area, presence therein of a large proportion of fine particles was confirmed by inspection of photomicrographs taken by an electron microscope. When this synthetic yellow iron oxide was treated by the method of the present invention, the treated product was seen no longer to contain fine particles, was observed to have improved dimensional proportion of particles and was found to have the specific surface area notably decreased. Although the color of this product was yellowish brown, it had increased luminosity as compared with the color of the untreated raw material.

EXAMPLE 3

Iron hydroxide (II) was prepared from an aqueous iron chloride solution discharged as a spent liquid from the hydrochloric acid pickling of iron and steel in conjunction with ammonia. The iron hydroxide (II) was oxidized to form synthetic yellow iron oxide. This yellow iron oxide consisted of fine acicular particles, contained $\gamma$-FeOOH and $\beta$-FeOOH having low thermal decomposition points besides the principal component of $\alpha$-FeOOH, had a dark yellow color and showed so inferior hiding power and coloring power that it could not be used as a yellow pigment.

In 200ml of an aqueous 1N sodium hydroxide solution, 40g of said yellow iron oxide was dispersed. The dispersion was subjected to a hydrothermal treatment at 180°C for 30 minutes. The precipitate formed consequently therein was separated by following the procedure of Example 1. The product weighed 35g, indicating that the yield was about 88%.

The properties of the product and those of the raw material, yellow iron oxide, are compared in Table 5.

Table 5

| | Temperature of color change (°C) | Dimensional proportion of particle (length/width) | Specific surface area (m²/g) |
|---|---|---|---|
| Raw material (synthetic yellow iron oxide | 160 | 8.5:1 | 40.7 |
| Yellow iron oxide treated by this invention | 250 | 3.4:1 | 13.3 |

It is clear from the foregoing table that the treatment heightened the thermal decomposition point from 160°C to 250°C, improving the thermal stability to a notable extent. Owing to the reaction of a nature involving dissolution and precipitation, tactoid particles of the shape of slender needles were converted to particles of the shape of rods, with the result that the dimensional proportion of particles was improved from 8.5 to 3.4 and at the same time the specific surface area was decreased appreciably from 40.7 m²/g to 13.8 m²/g. The yellow iron oxide thus modified showed a lowered oil-absorbing capacity, improved hiding power and coloring power, had a bright yellow color instead of said dark yellow color and proved feasible as a pigment for coloring materials.

EXAMPLE 4

In 200ml of water, 80g of synthetic yellow iron oxide was dispersed. The resultant slurry was placed in an autoclave and subjected to a hydrothermal treatment at 160°C for 20 minutes, with simultaneous agitation.

The slurry thus treated was removed from the autoclave, filtered and dried. The product thus obtained weighed about 79g, indicating that the yield was about 99%.

The properties of the product and those of the raw material, synthetic yellow iron oxide, are given in Table 6 for comparison.

Table 6

| | Temperature of color change (°C) | Dimensional proportion of particle (length/width) | Specific surface area (m²/g) |
|---|---|---|---|
| Raw material (synthetic yellow iron oxide) | 200 | 7.8:1 | 21.2 |
| Yellow iron oxide treated by this invention | 250 | 4.5:1 | 10.3 |

EXAMPLE 5

In 200ml of an aqueous 0.2N sodium hydroxide solution, 50g of synthetic yellow iron oxide of the magnetic tape grade having particle properties as shown in Table 6 was dispersed. The dispersion was subjected to a hydrothermal treatment at 150°C for 30 minutes. The precipitate consequently formed was recovered. The product was found to have improved properties as indicated in Table 7.

Table 7

| | Temperature of color change (°C) | Diameter of particle ($\mu$) | Dimensional proportion of particle (length/width) | Specific surface area (m²/g) |
|---|---|---|---|---|
| Raw material (synthetic yellow iron oxide | 180 | 0.4 | 9:1 | 29.3 |
| Yellow iron oxide treated by this invention | 240 | 0.3 | 6:1 | 20.1 |

From Table 7, it is seen that particle diameter, dimensional proportion of particle and specific surface area were invariably decreased by about one third from their respective original values. In the present example, the ratios of decrease were smaller than in the other examples because of the influences of the temperature of hydrothermal treatment and the concentration of alkali in the aqueous solution. For this yellow iron oxide to be useful in magnetic materials, any decrease of dimensional proportion greater than is actually necessary is undesirable. In view of the decrease of the specific surface area and from the inspection of the photomicrographs taken by an electron microscope, it is inferred that extremely fine particles had been dissolved and then deposited in the form of precipitate on other particles. The range of particle size distribution, therefore, was narrowed to an appreciable extent. By using this yellow iron oxide, $\gamma$-Fe$_2$O$_3$ for magnetic recording media was prepared. To be specific, this $\gamma$-Fe$_2$O$_3$ was produced by heating said yellow iron oxide in a current of hydrogen gas at 360°C for 2 hours to effect conversion into Fe$_3$O$_4$ and further heated at 200°C for 30 minutes to cause air oxidation of Fe$_3$O$_4$. The main properties of the product are shown in Table 8, in which those obtained of a countertype prepared from an untreated synthetic yellow iron oxide are also indicated for comparison.

Table 8

| | Dimensional proportion of particle (length/width) | Coercive force (Oe) | Specific surface area (m²/g) |
|---|---|---|---|
| γ-Fe₂O₃ from yellow iron oxide treated according to the present invention | 5:1 | 370 | 21.3 |
| γ-Fe₂O₃ from yellow iron oxide in its untreated state | 6:1 | 370 | 30.5 |

It is seen from the table that the dimensional proportion of the particles slightly smaller for the product treated according to the present invention, the coercive force is nearly equal for both the products and the specific surface area is considerably smaller for the product according to this invention. The reason for this is that the product obtained by the treatment of this invention does not contain fine particles but is composed of particles of a satisfactorily uniform size. The condition of anisotropic magnetic field distribution, therefore, was satisfactory, for the distribution was limited to a sufficiently narrow range. When magnetic tapes were prepared by using these products, the one containing the product treated by this invention exhibited better magnetic field directionality, higher packing density of magnetic powder, more satisfactory sensitivity and more desirable signal/noise ratio.

What is claimed is:

1. A method for the improvement of properties of synthetic yellow iron oxide, which comprises dispersing said synthetic yellow iron oxide in an aqueous 0 – 10N alkali solution, subjecting the resultant slurry to a hydrothermal treatment at temperatures in the range of 100° – 250°C under saturated pressure of steam and recovering from the hydrothermally treated slurry the yellow iron oxide.

2. A method for the improvement of properties of synthetic yellow iron oxide, which comprises dispersing said synthetic yellow iron oxide in water, subjecting the resultant slurry to a hydrothermal treatment at temperatures in the range of 100° – 250°C under saturated pressure of steam and recovering from the hydrothermally treated slurry the yellow iron oxide.

3. The method according to claim 1 wherein the mother liquor remaining after the recovery of the yellow iron oxide is put to cyclic use as an aqueous alkali solution in said hydrothermal treatment.

4. A method for the manufacture of a pigment of yellow iron oxide, which comprises dispersing yellow iron oxide in an aqueous 0.5 – 1N sodium hydroxide solution at a ratio of 40 – 100g of said yellow iron oxide to 200ml of said aqueous alkali solution, subjecting the resultant slurry to a hydrothermal treatment at temperatures in the range of 120° – 180°C for about 30 minutes and recovering from the hydrothermally treated slurry the precipitated yellow iron oxide.

5. A method for the manufacture of γ-iron oxide of the grade suitable for use in magnetic tapes, which comprises dispersing synthetic yellow iron oxide in an aqueous 0.5 – 1N sodium hydroxide solution at a ratio of 40 – 100g of said synthetic yellow iron oxide to 200ml of said aqueous alkali solution, subjecting the resultant slurry to a hydrothermal treatment at about 150°C for about 30 minutes, recovering from the hydrothermally treated slurry the yellow iron oxide, treating the recovered yellow iron oxide in a current of hydrogen gas at about 360°C for about 2 hours to obtain Fe₃O₄ and treating the resultant Fe₃O₄ in the air at about 200°C for about 30 minutes to obtain γ-iron oxide.

* * * * *